Oct. 13, 1959     L. A. RUNTON ET AL     2,908,028
WINDSHIELD WIPER OR THE LIKE
Filed Aug. 22, 1957
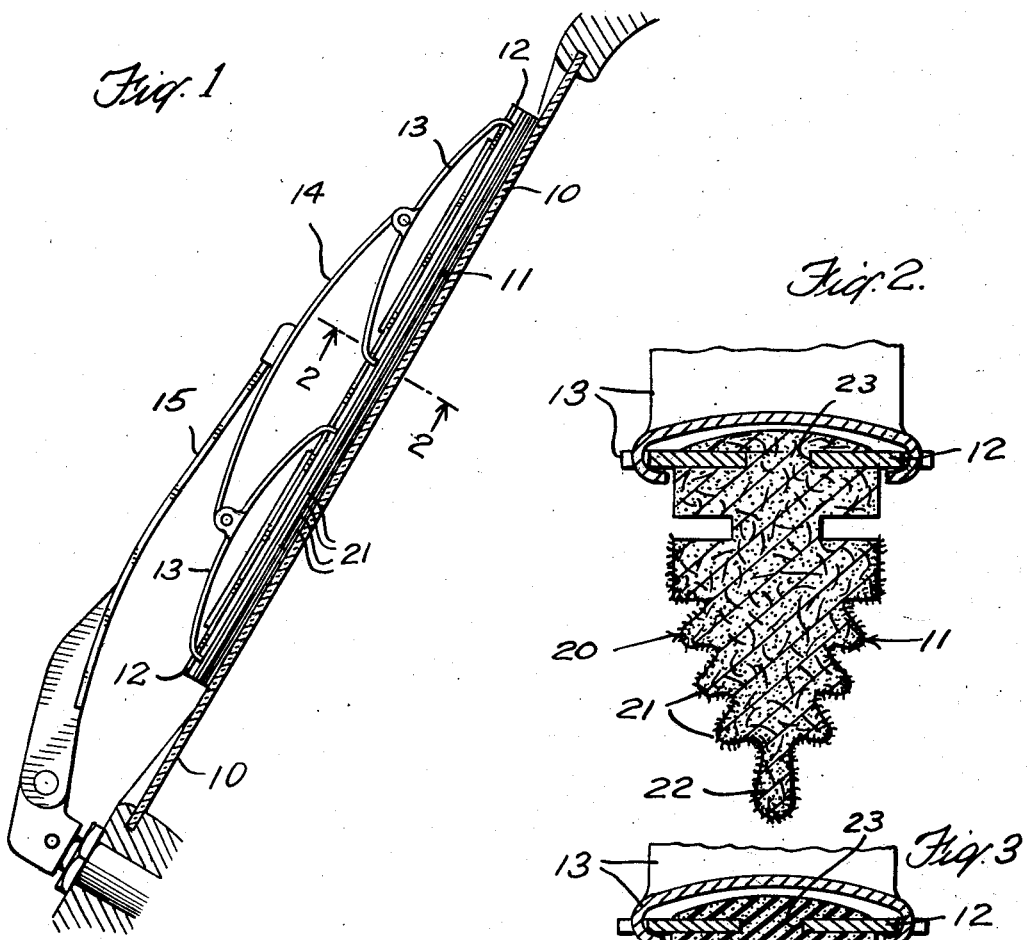
INVENTORS
LESLIE A. RUNTON
HENRY C. MORTON
BY
*ATTORNEY*

2,908,028

WINDSHIELD WIPER OR THE LIKE

Leslie A. Runton, Middle Haddam, and Henry C. Morton, Branford, Conn., assignors to The Russell Manufacturing Company, Middletown, Conn., a corporation of Connecticut Application August 22, 1957, Serial No. 679,604

2 Claims. (Cl. 15—245)

This invention relates to windshield wipers and the like and has for an object to provide a wiper blade having novel and improved characteristics.

Another object is to provide a blade having a contacting surface to which dirt particles will not adhere and which thus eliminates the tendency to scratch the glass or other surface being wiped.

Other objects and advantages will be apparent as the nature of the invention is more fully disclosed.

In accordance with the present invention the contacting edge of the wiper blade is composed of Teflon, tetrafluoroethylene, either in yarn form or in the form of flock embedded in a plastic. Teflon has a low coefficient of friction and will not adhere to or attract particles such as dust or dirt. Teflon's coefficient of friction is so low that it slides over the glass surface without appreciable friction and dirt particles are not retained to scratch the surface.

The nature of the invention will be better understood from the following description, taken in connection with the accompanying drawing in which a specific embodiment has been set forth for purposes of illustration.

In the drawing:

Fig. 1 is a transverse vertical section through a windshield illustrating a wiper embodying the invention;

Fig. 2 is a section taken on the line 2—2 of Fig. 1 on a much enlarged scale illustrating the construction of the blade;

Fig. 3 is a section similar to Fig. 2 illustrating a non-elected modification;

Fig. 4 is a plan view of a fabric which forms the facing for the blade of Fig. 3; and Fig. 5 is a diagrammatic view illustrating the weave of the fabric of Fig. 4.

Referring to the drawing more in detail, Fig. 1 illustrates a wiper of standard type for a curved windshield 10. The wiper comprises blade 11 mounted in a flexible metal strip 12 secured by a pair of spring arms 13 to a bracket 14 which is hung on the end of an arm 15 mounted to oscillate in the usual manner.

The blade 11 is shown in Fig. 2 is composed of a molded body 20 having tapered sides with sawtooth serrations forming points 21 which constitute wiping edges when the blade flexes and terminating in a wiping flange 22. The upper edge of the blade 11 is secured in a slit 23 in the metal strip 12.

In accordance with this invention the blade 11 is composed of a natural or synthetic resin such as polyvinylchloride, epoxy resin, a phenolic molding resin, or natural or synthetic rubber. Teflon flock of ½ mm. to 1½ mm. length is embedded in the body 20 and forms a surface layer of projecting felt-like flock which is secured in the resin and projects from the surface thereof. Additional short (½ mm. length) flock may be disposed on the surface of the blade.

In the case of polyvinylchloride which is dissolved in a plasticizer such as tricresylphosphate to form a liquor prior to curing, the flock may be stirred into the liquid in the mold or prior to pouring and the mixture cured by heating to 350° F. to 360° F. and cooling.

The polyvinylchloride resin is plasticized to a flexible form so that the blade will flex and conform to the contour of the windshield or the like.

The epoxy resins are thermosetting and may be applied to the mold in the form of a molding powder. The Teflon flock is incorporated in the molding powder prior to curing. The mixture is cured by heating to the proper temperature to convert the resin into the form of a solid body in which the Teflon flock is embedded and is exposed on the surface as in the case of the polyvinylchloride resin above described. The body may also be composed of a high strength phenolic bonding resin derived from the reaction product of phenol, cresol or a homologue with formaldehyde under controlled conditions. The Teflon flock is mixed with the resin molding powder in the desired proportion prior to setting. The mixture is preheated to remove the solvent and the resin content polymerized until a residual volatile content of 5% to 7% is attained. The mixture is then molded under heat and pressure to the form shown. The conversion of the resin into a thermoset form may be accomplished at a temperature of 300° F. to 350° F. for from thirty to sixty minutes at pressures of 10 tons to 100 tons, depending upon the area of the object being molded.

With latex the flock is mixed with the liquid latex and the mass dried and vulcanized by heat in the presence of an accelerator in the usual manner.

The Teflon flock forms a wiping surface which slides over the surface of the glass without friction. Hence the wiper may be used for long periods of time without scratching the wiped surface.

In the modification of Figs. 3 to 5 the wiper blade 29 is formed as in Fig. 2 but is shown as having smooth side surfaces 28. In this form the Teflon flock is omitted and a Teflon fabric 30 is disposed over the surface of the blade and secured by a suitable adhesive 29. Since Teflon itself will not bond to an adhesive the fabric is woven to have an undersurface of cotton or the like and an exposed surface of Teflon yarn. As shown in Figs. 4 and 5 the fabric 30 comprises filler shots 31 of cotton, spun Dacron, nylon, rayon or other materials which are capable of bonding to an adhesive. Teflon warp yarns 32 are woven in twill formation to extend over three filler shots to form surface loops 33 and under a single filler shot 31. By staggering the warps in twill formation the filler 31 is exposed on the under surface between adjacent warps while the loops 33 are exposed on the upper surface.

The exposed fillers are bonded by adhesive 29 to the molded blade 27 with the Teflon exposed to form the wiping surface. In operation the Teflon surface removes the dust particles without scratching the wiped surface as described above.

What is claimed is:

1. A wiper for a windshield or the like, comprising a blade mounted to wipe the surface of said windshield, said blade being composed of a resin body of the desired shape and a coating of flock composed of Teflon yarn having a length of the order of from ½ mm. to 1½ mm.

embedded in said resin body and forming the contacting edge of said blade.

2. A wiper for a windshield or the like, comprising a blade mounted to wipe the surface of said windshield, said blade being composed of a epoxy resin body of the desired shape and a coating of flock composed of Teflon yarn having a length of the order of from ½ mm. to 1½ mm. embedded in said epoxy resin body and forming the contacting edge of said blade.

References Cited in the file of this patent

UNITED STATES PATENTS

| | | |
|---|---|---|
| 2,596,063 | Anderson | May 6, 1952 |
| 2,728,698 | Rudner | Dec. 27, 1955 |
| 2,773,781 | Rodman | Dec. 11, 1956 |

FOREIGN PATENTS

| | | |
|---|---|---|
| 622,370 | Great Britain | May 2, 1949 |